(12) United States Patent
Maliverney

(10) Patent No.: US 8,455,562 B2
(45) Date of Patent: Jun. 4, 2013

(54) SILICONE COMPOSITION SUITABLE FOR CROSS-LINKING BY DEHYDROGENATIVE CONDENSATION IN THE PRESENCE OF A NON-METAL CATALYST

(75) Inventor: Christian Maliverney, Saint Julien sur Bibost (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/379,328

(22) PCT Filed: Jun. 15, 2010

(86) PCT No.: PCT/FR2010/000439
§ 371 (c)(1),
(2), (4) Date: Mar. 19, 2012

(87) PCT Pub. No.: WO2010/149869
PCT Pub. Date: Dec. 29, 2010

(65) Prior Publication Data
US 2012/0172471 A1   Jul. 5, 2012

(30) Foreign Application Priority Data
Jun. 19, 2009   (FR) ...................................... 09 02980

(51) Int. Cl.
| | | |
|---|---|---|
| C09D 183/06 | (2006.01) | |
| B05D 3/02 | (2006.01) | |
| B05D 7/24 | (2006.01) | |
| C08J 9/00 | (2006.01) | |
| C08G 77/14 | (2006.01) | |
| C08G 77/08 | (2006.01) | |

(52) U.S. Cl.
USPC ............. 521/129; 528/21; 521/154; 524/588; 488/387

(58) Field of Classification Search
None
See application file for complete search history.

(56) References Cited

U.S. PATENT DOCUMENTS

| | | | |
|---|---|---|---|
| 3,086,954 A * | 4/1963 | Polmateer et al. ............ 523/212 |
| 3,923,705 A | 12/1975 | Smith | |
| 4,339,563 A * | 7/1982 | Takago et al. ................... 528/14 |
| 4,358,613 A * | 11/1982 | Mark ............................. 564/238 |
| 4,395,526 A * | 7/1983 | White et al. ..................... 528/18 |
| 4,472,551 A * | 9/1984 | White et al. ................... 524/728 |
| 4,515,932 A * | 5/1985 | Chung ............................ 528/16 |
| 4,814,368 A * | 3/1989 | Stein et al. .................... 524/158 |
| 4,849,564 A * | 7/1989 | Shimizu et al. ............... 524/114 |
| 5,176,960 A * | 1/1993 | Shimizu et al. ............... 428/405 |
| 6,235,832 B1 * | 5/2001 | Deng et al. .................... 524/525 |
| 6,906,161 B2 * | 6/2005 | Sakamoto et al. .............. 528/35 |
| 7,053,166 B2 * | 5/2006 | Brehm et al. .................... 528/14 |
| 7,442,666 B2 * | 10/2008 | Herrwerth et al. ............ 502/100 |
| 7,649,059 B2 * | 1/2010 | Yoshitake et al. ............. 525/478 |
| 7,763,358 B2 * | 7/2010 | Matsumura et al. .......... 428/452 |
| 2003/0228473 A1 | 12/2003 | Benayoun et al. | |
| 2005/0014894 A1 * | 1/2005 | Flannigan et al. ............ 524/864 |
| 2007/0027286 A1 | 2/2007 | Blanc-Magnard et al. | |
| 2009/0182091 A1 * | 7/2009 | Noro et al. .................... 524/588 |
| 2010/0036049 A1 * | 2/2010 | Matsushita et al. ........... 524/588 |

FOREIGN PATENT DOCUMENTS

| | | | |
|---|---|---|---|
| EP | 1 930 376 A1 | 6/2008 | |
| EP | 1 985 666 A1 | 10/2008 | |

OTHER PUBLICATIONS

International Search Report (PCT/ISA/210) issued on Oct. 14, 2010, by European Patent Office as the International Searching Authority for International Application No. PCT/FR2010/000439.

* cited by examiner

Primary Examiner — Robert S Loewe
(74) Attorney, Agent, or Firm — Dentons US LLP

(57) ABSTRACT

A silicone composition is described that includes components having SiH/SiOH groupings and that can be polymerized/cross-linked by a dehydrocondensation reaction in the presence of a non-metal catalyst such as non-silylated, pentasubstituted guanidine, requiring a low activation temperature.

22 Claims, No Drawings

SILICONE COMPOSITION SUITABLE FOR CROSS-LINKING BY DEHYDROGENATIVE CONDENSATION IN THE PRESENCE OF A NON-METAL CATALYST

This application claims priority under 35 U.S.C. §119 of FR 0902980, filed Jun. 19, 2009, and is the U.S. national phase of PCT/FR2010/000439, filed Jun. 15, 2010, and designating the United States (published in the French language on Dec. 29, 2010, as WO 2010/149869 A1; the title and abstract were also published in English), each hereby expressly incorporated by reference in its entirety and each assigned to the assignee hereof.

The present invention relates to the field of the catalysis of dehydrogenative condensation reactions which make possible silicone polymerization/crosslinking. The reactive entities involved are monomers, oligomers and/or polymers of polyorganosiloxane nature.

The reactive units concerned in these entities are, on the one hand, ≡SiH units and, on the other hand, ≡SiOH units. Dehydrogenative condensation between these silicone reactive units results in the formation of ≡Si—O—Si≡ bonds and in the release of hydrogen gas.

This dehydrogenative condensation is an alternative to the polymerization/crosslinking routes known in the field of silicones, namely the route of polyaddition by reaction between ≡SiH and ≡Si-alkenyl (vinyl) units, and the route of polycondensation by reaction between ≡SiOR and ≡SiOR units (with R=alkyl). All these polymerization/crosslinking routes result in more or less polymerized and more or less crosslinked silicone products which can constitute products that can be used in multiple applications: adhesives, leak-tightness products, pointing products, adhesion finishes, release coatings, foams, etc.

It is known, according to French patent FR-B-1 209 131, that a reaction between a silanol $Ph_2Si(OH)_2$ and a said organosiloxane $[(Me_2HSi)_2O]$ with Me=methyl and Ph=phenyl, by dehydrogenative condensation, can be catalyzed by a chloroplatinic acid ($H_2PtCl_6 \cdot 6H_2O$).

It is also known practice to use a rhodium complex ($RhCl_3[(C_8H_{17})_2S]_3$), for example as mentioned in U.S. Pat. No. 4,262,107, a platinum complex such as the Karstedt catalyst, or platinum-based, rhodium-based, palladium-based or iridium-based metal catalysts. As iridium-based catalyst, mention may be made of the following compounds: $IrCl(CO)(TPP)_2$, $Ir(CO)_2(acac)$, $IrH(Cl)_2(TPP)_3$, $[IrCl(cyclooctene)_2]_2$, $IrI(CO)(TPP)_2$ and $IrH(CO)(TPP)_3$, in which formulae TPP signifies a triphenylphosphine group and acac signifies an acetylacetonate group.

Other examples are catalysts such as amines, colloidal nickel or dibutyltin dilaurate (see the handbook by Noll, "Chemistry and technology of silicones", page 205, Academic Press, 1968-$2^{nd}$ edition). However, alkyltin-based catalysts, although they are very effective, most commonly colorless, liquid and soluble in silicone oils, have the drawback of being toxic (CMR2 toxic to reproduction).

Other catalysts, such as boron derivatives of tris(pentafluorophenyl)-borane type, are described in French patent application 25 FR-A-2 806 930.

U.S. Pat. No. 4,262,107 describes a silicone composition comprising a polydimethyldisiloxane possessing silanol ends, a crosslinking agent consisting of a polyorganosiloxane possessing units in the chain and possessing trimethylsilyl ends, and a catalyst consisting of a rhodium complex ($RhCl_3[(C_8H_{17})_2S]_3$). This silicone composition which can be crosslinked by dehydrogenative condensation in the presence of a rhodium complex can be used for producing release coatings on flexible supports such as paper and plastic or metal films. The crosslinking is carried out at a temperature of 150° C.

European patent application EP-A-1 167 424 describes the production of linear block silicone copolymers by dehydrogenative condensation of a polydimethylsiloxane possessing silanol ends and of a polyorganosiloxane comprising aromatic groups and possessing ≡SiH ends, in the presence of a metal catalyst which may be platinum-based, rhodium-based, palladium-based or iridium-based, platinum being particularly preferred.

French patent application FR-A-2 806 930 describes the use of boron derivatives of tri(pentafluorophenyl)borane type as a thermoactivatable catalyst for dehydrogenative condensation between a polyorganosiloxane possessing ≡SiH units and a polyorganosiloxane possessing ≡SiOH end units. Such silicone compositions which can be crosslinked by dehydrogenative condensation in the presence of Lewis acids of boron derivative type can be used for the production of release coatings on flexible supports, in particular on paper, and also in the production of crosslinked silicone foams in which the release of hydrogen and the quality of the crosslinking network are controlled.

It emerges from this review of the prior art relating to the catalysis of dehydrogenative condensation between a polyorganosiloxane possessing a ≡SiOH siloxyl unit and a polyorganosiloxane possessing a ≡SiH siloxyl unit, that there is a significant need to:
1) find new tin-free catalysts,
2) reduce the activation temperature of the catalyst, and
3) limit the side reactions.

Thus, one of the essential objectives of the present invention is to propose a silicone composition comprising components bearing ≡SiH/≡SiOH groups and which can be polymerized/crosslinked by a dehydrogenative condensation reaction, in the presence of a nontoxic catalyst which does not contain tin and which requires a low activation temperature.

Another essential objective of the present invention is to provide a process for polymerizing and/or crosslinking a composition of the type of that mentioned in the description of the objectives above; this process must be rapid, economical and effective in terms of quality of final product obtained.

Another essential objective of the invention is to provide a process for the production of at least one release coating on a support (preferably a flexible support), which consists in using the process for crosslinking/polymerization or of the composition mentioned above.

Another essential objective of the invention is to provide a process for the production of at least one article made of crosslinked silicone foam, which consists in using the above-mentioned crosslinking/polymerization process and/or the composition mentioned above in the objectives, this process making it possible to control the volume of hydrogen gas given off and the quality of the elastomer formed.

These objectives, among others, are achieved by means of the present invention which relates, first of all, to a siloxane composition X which does not contain any metal catalyst and which can be polymerized and/or crosslinked by dehydrogenative condensation, comprising:
  at least one organosiloxane monomer, oligomer and/or polymer B having, per molecule, at least one reactive ≡SiH unit;
  at least one organosiloxane monomer, oligomer and/or polymer C having, per molecule, at least one reactive ≡SiOH unit;

a catalytically effective amount of at least one dehydrogenative condensation catalyst A which is a nonsilylated organic compound corresponding to general formula (I):

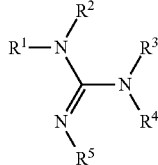

in which:
- the $R^1$, $R^2$, $R^3$, $R^4$ or $R^5$ radicals, which may be identical or different, represent, independently of one another, a linear or branched monovalent alkyl group, a cycloalkyl group or a (cycloalkyl)alkyl group, the ring being substituted or unsubstituted and being able to comprise at least one heteroatom or a fluoroalkyl group, an aromatic group, an arylalkyl group, a fluoroalkyl group, or an alkylamine or alkylguanidine group,
- the $R^1$, $R^2$, $R^3$ or $R^4$ radicals can be linked in pairs so as to form a 3-, 4-, 5-, 6- or 7-membered aliphatic ring optionally substituted with one or more substituents, and
- with the additional condition that the $R^1$, $R^2$, $R^3$, $R^4$ and $R^5$ radicals do not comprise a silicon atom, optionally at least one polyorganosiloxane resin D; and optionally at least one filler E.

The nonsilylated compounds according to the invention and corresponding to general formula (I) are pentasubstituted guanidines and have the advantage of being liquid, colorless, odorless and soluble in silicone matrices. The nonsilylated guanidines according to the invention are used in the silicone systems to be crosslinked at very low contents.

The use of such compounds, even in a small amount, makes it possible to catalyze this dehydrogenative condensation reaction between siloxane entities comprising ≡SiH and ≡SiOH units, under mild temperature conditions. Silicone polymers or networks are thus obtained in a few minutes, at ambient temperature.

The in accordance with the invention are effective and economical, in particular with regard to platinum catalysts.

According to one preferred embodiment of the invention, the dehydrogenative condensation catalyst A is a nonsilylated organic compound chosen from the group consisting of the following compounds (A1) to (A4):

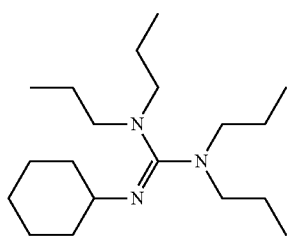

(A1)

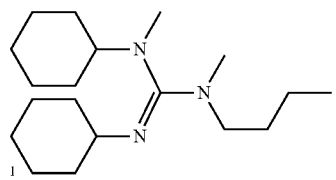

(A2)

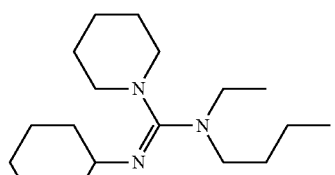

(A3)

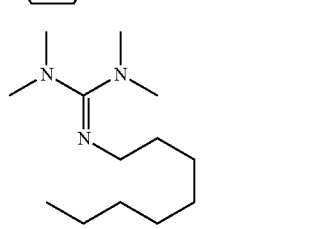

(A4)

They are also advantageous because, at low concentration, they require only limited amounts of energy in order to activate the dehydrogenative condensation. In particular, they can in fact be activated as soon as the temperature is at ambient temperature.

They are in particular advantageous for preparing elastomeric silicone networks under mild and economical conditions. The applications targeted in this case relate in particular to the adhesion resistance of paper, where it is desired to replace the current systems with less expensive systems, and silicone foams, where it is desired to control the evolution of hydrogen and the quality of the network. For the first application, it is preferable to control the diffusion of the hydrogen in order to prevent the formation of bubbles. For the second application, it is necessary to manage the size of the bubbles in order to optimize the properties of the final foam.

These results are all the more significant as the reactivity of siloxane entities, in particular in forming nonlinear (crosslinked) products, is not very high if it is compared with that of hydrosilanes and alcohols in dehydrogenative condensation.

Quantitatively, the catalyst A according to the invention is advantageously present in an amount ranging between 0.01 and 3% by weight, preferably between 0.1 and 1% by weight, relative to the weight of the dry matter of organosiloxane monomer, oligomer and/or polymer to be reacted.

Preferentially, the organosiloxane monomers, oligomers and/or polymers B possessing reactive ≡SiH units have at least one unit of formula (II) and end with units of formula (III) or are cyclic entities consisting of units of formula (II), these formulae being represented below:

$$\begin{array}{c} R^1 \\ | \\ -(Si-O)- \\ | \\ Z \end{array}$$ (II)

-continued

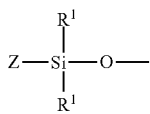
(III)

in which:

the symbols $R^1$ are identical or different and represent:
- a linear or branched alkyl radical containing 1 to 8 carbon atoms, which is optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms, the symbols Z are alike or different and represent:
- a hydrogen radical, or
- a group $R^1$ with the condition that there are, per molecule, at least two symbols Z representing a hydrogen atom.

According to one preferential embodiment, the organosiloxane monomers, oligomers and/or polymers C possessing reactive ≡SiOH units have at least one unit of formula (IV) and end with units of formula (V) or are cyclic entities consisting of units of formula (IV), said formulae being represented below:

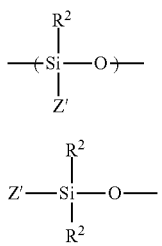

in which:

the symbols $R^2$ are identical or different and represent:
- a linear or branched alkyl radical containing 1 to 8 carbon atoms, which is optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms, and the symbols Z' are alike or different and represent:
- a hydroxyl group, or
- a group $R^2$ with the condition that, per molecule, at least two symbols Z represent a hydroxyl group —OH.

The entities of B and C type can also include, in their structure, "(Q)" or "(T)" units defined as indicated below:

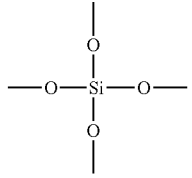
(Q)

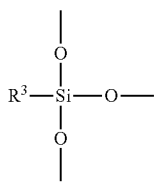
(T)

with it being possible for $R^3$ to represent one of the substituents proposed for $R^1$ or $R^2$.

According to one advantageous variant of the invention, the polyorganosiloxanes B used comprise from 1 to 50 ≡SiH siloxyl unit(s) per molecule.

According to one advantageous variant of the invention, the polyorganosiloxanes C used comprise from 1 to 50 ≡SiOH siloxyl unit(s) per molecule.

Particularly preferred as derivatives B are the organosiloxane monomers, oligomers and/or polymers B possessing a reactive ≡SiH unit which correspond to general formula (VI):

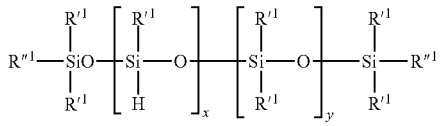
(VI)

in which:

x and y each represent an integer or fractional number ranging between 0 and 200, $R'^1$ and $R'''^1$ represent, independently of one another:
- a linear or branched alkyl radical containing 1 to 8 carbon atoms, which is optionally substituted with at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl part having an alkyl part containing between 5 and 14 carbon atoms and an aryl part containing between 6 and 12 carbon atoms, which is optionally substituted on the aryl part, and it being possible for $R'''^1$ also to correspond to hydrogen, with the condition according to which the radicals $R'''^1$ correspond to hydrogen when x=0.

Particularly preferred as derivatives C are the organosiloxane monomers, oligomers and/or polymers C possessing a reactive ≡SiOH unit which correspond to the general formula (VII):

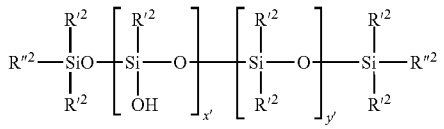
(VII)

in which:
x' and y' each represent an integer or a fractional number ranging between 0 and 1200,
R'² and R"² represent, independently of one another:
  a linear or branched alkyl radical containing 1 to 8 carbon atoms, which is optionally substituted with at least one halogen, preferably fluorine, the alkyl radicals preferably being methyl, ethyl, propyl, octyl and 3,3,3-trifluoropropyl,
  an optionally substituted cycloalkyl radical containing between 5 and 8 cyclic carbon atoms,
  an optionally substituted aryl radical containing between 6 and 12 carbon atoms, or
  an aralkyl part having an alkyl part containing between 5 and 14 carbon atoms and an aryl part containing between 6 and 12 carbon atoms, which is optionally substituted on the aryl part,
it being possible for R"² also to correspond to OH, with the condition according to which the radicals R"² correspond to OH when x'=0.

The following compounds:

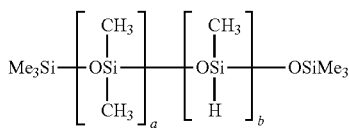
S1

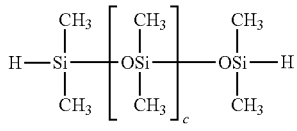
S2

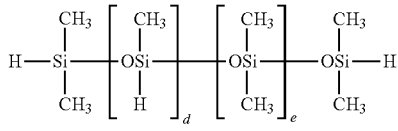
S3 with a, b, c, d and e representing a number ranging from:
in the polymer of formula S1:
  0≦a≦150, preferably 0≦a≦100, preferably 0≦a≦20
  and
  1≦b≦55, preferably 10≦b≦55, preferably 30≦b≦55,
in the polymer of formula S2:
  0≦c≦15,
in the polymer of formula S3:
  5≦d≦200, preferably 20≦d≦50
  and
  2≦e≦50, preferably 10≦e≦30,
are quite particularly suitable for the invention as silicone derivatives B.

The compounds of formula S4 below:

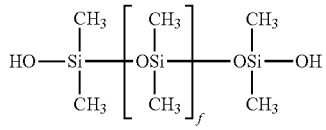
S4 with 1≦f≦1200, preferably 50≦f≦400, and even more preferentially 150≦f≦250, are quite particularly suitable for the invention as silicone derivatives C.

Provided that the siloxane entities B and C are oligomers or polymers, they can be described as indicated below.

The polyorganosiloxane B can be linear (e.g. (VI)), branched or cyclic. For economic reasons, its viscosity is preferably less than 100 mPa·s; the identical or different organic radicals are preferably methyl, ethyl and/or phenyl. When the polyorganosiloxane is linear, the hydrogen atoms of the ≡SiH functions are bonded directly to the silicon atoms located at the chain end(s) and/or in the chain.

By way of example of a linear constituent B, mention may be made of polymethylhydrosiloxanes possessing trimethylsiloxyl and/or hydrodimethylsiloxy ends.

Among the cyclic polymers, mention may be made of those corresponding to the following formulae:

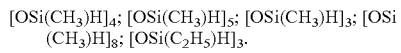

[OSi(CH₃)H]₄; [OSi(CH₃)H]₅; [OSi(CH₃)H]₃; [OSi(CH₃)H]₈; [OSi(C₂H₅)H]₃.

The constituent C can exhibit a viscosity which can reach 200 000 mPa·s. For economic reasons, a constituent of which the viscosity is generally about 20 to 10 000 mPa·s is chosen.

The identical or different organic groups generally present in the constituents C, α,ω-hydroxylated oils or gums, are methyl, ethyl, phenyl or trifluoropropyl radicals. Preferably, at least 80% by number of said organic groups are methyl groups bonded directly to the silicon atoms. In the context of the present invention, α,ω-bis(hydroxy)polydimethylsiloxanes are more especially preferred.

The polyorganosiloxane C may be a resin. The resins C possessing silanol functions have, per molecule, at least one of the R'SiO₁/₂ unit (M unit) and R'²SiO₂/₂ unit (D unit), in combination with at least one of the R'SiO₃/₂ unit (T unit) and SiO₄/₂ unit (Q unit). The R' radicals generally present are methyl, ethyl, isopropyl, tert-butyl and n-hexyl. As examples of resins, mention may be made of MQ(OH), MDQ(OH), TD(OH) and MDT(OH) resins.

It is possible to use solvents for the polyorganosiloxanes B or C so as to adjust the viscosity of the composition. By way of examples of such conventional solvents for silicone polymers, mention may be made of solvents of aromatic type, such as xylene and toluene, saturated aliphatic solvents, such as hexane, heptane, white spirit®, tetrahydrofuran and diethyl ether, and chlorinated solvents, such as methylene chloride and perchloroethylene. In the context of the present invention, it will be preferable, however, not to use a solvent.

The ≡SiH/≡SiOH molar ratio is advantageously between 1 and 100, preferably between 10 and 50, and even more preferentially between 15 and 45.

The composition according to the invention can also comprise one or more polyorganosiloxane resins D. These resins are branched polyorganosiloxane oligomers or polymers which are well known and commercially available. They are present in the form of solutions, preferably siloxane solutions. They have, in their structure, at least two different units chosen from those of formula:

$R'_3SiO_{1/2}$(M unit), $R'_2SiO_{2/2}$(D unit), $R'SiO_{3/2}$(T unit) and $SiO_{4/2}$(Q unit), with at least one of these units being a T or Q unit.

The R' radicals are identical or different and are chosen from linear or branched $C_1$-$C_6$ alkyl radicals, $C_2$-$C_4$ alkenyl radicals, phenyl or 3,3,3-tri-fluoropropyl.

Mention may, for example, be made of methyl, ethyl, isopropyl, tert-butyl and n-hexyl radicals, as alkyl radicals R', and of vinyl radicals, as alkenyl radicals R.

It should be understood that, in the polyorganosiloxane resins D of the abovementioned type, a part of the R' radicals are alkenyl radicals.

As examples of branched organopolysiloxane oligomers or polymers D, mention may be made of MQ resins, MDQ resins, TD resins and MDT resins, it being possible for the alkenyl functions to be borne by the M, D and/or T units. As examples of resins -E- which are particularly suitable, mention may be made of the vinylated MDQ or MQ resins having a content by weight of vinyl groups of between 0.2 and 10% by weight, these vinyl groups being borne by the M and/or D units.

This resin D is advantageously present in a concentration of between 5 and 70% by weight, relative to the combined constituents of the composition, preferably between 10 and 60% by weight, and even more preferentially between 20 and 60% by weight.

The composition according to the invention can also contain a filler E, preferably an inorganic filler, chosen from siliceous or nonsiliceous materials. When siliceous materials are involved, they can act as reinforcing or semi-reinforcing filler. The reinforcing siliceous fillers are chosen from colloidal silicas, fumed and precipitated silica powders, or mixtures thereof.

These powders have an average particle size of generally less than 0.1 μm and a BET specific surface area of greater than 50 $m^2/g$, preferably between 100 and 300 $m^2/g$.

The semi-reinforcing siliceous fillers such as diatomaceous earths or ground quartz can also be used.

With regard to nonsiliceous inorganic materials, they can be involved as semi-reinforcing or bulking inorganic filler. Examples of these nonsiliceous fillers that can be used alone or as a mixture are carbon black, titanium dioxide, aluminum oxide, alumina hydrate, expanded vermiculite, zirconia, a zirconate, unexpanded vermiculite, calcium carbonate, zinc oxide, mica, talc, iron oxide, barium sulfate and slaked lime. These fillers have a particle size generally of between 0.001 and 300 μm and a BET surface area of less than 100 $m^2/g$.

In practice but without implied limitation, the filler used is a silica.

The filler can be treated using any appropriate compatibilizing agent and in particular hexamethyldisilazane. For further details in this regard, reference may be made, for example, to patent FR-B-2 764 894.

With regard to the weight, it is preferable to use an amount of filler of between 5 and 30% and preferably between 7 and 20% by weight, relative to the combined constituents of the preparation.

Naturally, the composition can be enriched using all kinds of additives, depending on the intended final applications.

In the adhesion resistance application on flexible supports (paper or polymer film), the composition can comprise an adhesion adjusting system selected from known systems.

This may involve those described in French patent FR-B-2 450, 642, U.S. Pat. No. 3,772,247 or European patent application EP-A-0 601 938.

Other functional additives of this composition may be bactericides, photosensitizers, fungicides, corrosion inhibitors, antifreeze agents, wetting agents, antifoams, synthetic latexes, colorants or acidifying agents.

Among conventional additives, mention may also be made of adhesion promoters, such as, for example, those comprising at least one alkoxylated organosilane, at least one epoxidized organosilicon compound and at least one metal chelate and/or one metal alkoxide, for example vinyltrimethoxysilane or VTMO,
glycidoxypropyltrimethoxysilane or GLYMO, and
tert-butyl titanate or TBOT.

This composition may be a solution or an emulsion. In the latter case, it can then comprise at least one surfactant and optionally at least one pH-fixing agent, such as $HCO_3^-$/$CO_3^{2-}$ and/or $H_2PO_4^-$/$HPO_4^{2-}$.

Another means of defining the invention consists in apprehending it from the angle of the use of at least one catalyst A according to the invention and as defined above for the dehydrogenative condensation between, on the one hand, at least one organosiloxane monomer, oligomer and/or polymer B having, per molecule, at least one reactive a ≡SiH unit and, on the other hand, at least one organosiloxane monomer, oligomer and/or polymer C having, per molecule, at least one reactive a ≡SiOH unit.

According to another of its aspects, the present invention relates to a process for polymerizing and/or crosslinking a siloxane composition X according to the invention and as defined above, characterized in that a dehydrogenative condensation reaction is carried out between said compounds B and C, and in that said dehydrogenative condensation is initiated by the catalyst A according to the invention and as defined above.

Two embodiments are possible for the addition of the catalyst in accordance with the invention.

Said catalyst can either be added to the mixture of the compounds B and C, for example of the polymers of the S1, S2 or S3 type with a polymer of the S4 type, or preferably be premixed with the compound C, for example the polymer of the S4 type, before being placed in the presence of the compound B, for example the S1 or S2 or S3 polymer.

Regardless of the variant under consideration, the catalyst can be used as it is or in solution in a solvent.

Generally, the mixings are carried out with stirring at ambient temperature.

The solution of catalyst can, for example, be used to prepare a bath with the monomer(s), oligomer(s) and/or polymer(s) to be polymerized and/or crosslinked by dehydrogenative condensation, such that the concentration of the catalyst(s) present is between 0.01 and 5% by weight in said bath, and preferably between 0.05 and 0.5%.

The silicone composition according to the invention, which can be used in particular as a coating base for the production of release coatings with a water-repellent nature, is prepared using means and according to methodologies for mixing that are well known to those skilled in the art, whether compositions with or without solvents, or emulsions are involved.

The invention also relates to a process for the production of at least one release coating on a support, preferably a flexible support, characterized in that it consists essentially in applying, to this support, a siloxane composition X according to the invention and as defined above, and then in allowing the siloxane composition X to crosslink, optionally after thermal activation up to a temperature of 110° C.

In accordance with this process, the compositions can be applied using devices used on industrial machines for coating paper, such as a five-roll coating head, or air knife or equalizer bar systems, on flexible supports or materials, and then cured by moving through tunnel ovens heated at 100-110° C.

Said compositions can be deposited on any flexible material or substrate, such as paper of various types (supercalendered, coated or glassine), cardboard, cellulose sheets, metal sheets or plastic films (polyester, polyethylene, polypropylene, etc.).

The amounts of compositions deposited are about 0.5 to 2 g per m² of surface to be treated, which corresponds to the deposition of layers of about 0.5 to 2 μm.

The supports or materials thus coated can subsequently be brought into contact with any adhesive material, rubber, acrylic or the like, which is sensitive to pressure. The adhesive material is then easily detachable from said support or material.

The flexible supports coated with a release silicone film can be, for example:
- an adhesive tape, the internal face of which is coated with a layer of pressure-sensitive adhesive and the external face of which comprises the release silicone coating;
- or a paper or polymer film for protecting the adhesive face of a self-adhesive or pressure-sensitive adhesive element;
- or a polymer film of the poly(vinyl chloride) (PVC), polypropylene, polyethylene or polyethyleneterephthalate type.

Another subject of the invention relates to a process for the production of at least one article made of crosslinked silicone foam, characterized in that it consists essentially in crosslinking a composition as defined above, preferably using POSs A and B as defined above, and ensuring that at least one part of the hydrogen gas formed is not expelled from the reaction medium.

The compositions according to the invention are of use in the field of release coatings on paints, the encapsulation of electrical and electronic components, or coatings for textiles, and also in the field of the sheathing of optical fibers.

A subject of the invention is also any coatings obtained by crosslinking and/or polymerization of the siloxane composition X according to the invention and as defined above. These coatings may be of varnish, adhesive coating, release coating and/or ink type.

The invention is also directed toward:
- any articles consisting of a solid material of which at least one surface is coated with the abovementioned thermally crosslinked and/or polymerized siloxane composition X;
- and also the crosslinked silicone foam obtained by crosslinking an abovementioned siloxane composition X.

EXAMPLES

I) Preparation of the Catalysts According to the Invention

I) Preparation of the Catalysts According to the Invention (A-2): 1-butyl-2,3-dicyclohexyl-1,3-dimethylguanidine 18.38 g of cyclohexyl isocyanate (0.147 mol) are added, dropwise, to a solution of 19.12 g of N-methyl-N-cyclohexylamine (0.169 mol) in 160 ml of hexane, and then the cloudy mixture is refluxed for 2 h and then evaporated to dryness, to give 35 g of crude N,N'-dicyclohexyl-N-methylurea. 12 g of POCl₃ (78 mmol) are added, over the course of 1 h, to a suspension of 17 g of said crude N,N'-dicyclohexyl-N-methylurea (71.33 mmol) in 65 ml of dry toluene, and then, after a few hours at 20° C., 15.5 g of N-butyl-N-methylamine (0.178 mmol) are added over the course of 2 h, and then, after a further 2 h at 20° C., 50 ml of water are added. 49 g of 35% sodium hydroxide are then added while cooling, and then the two-phase medium is extracted with diisopropyl ether. After drying and evaporation to dryness, the oil obtained, 26.5 g, is distilled at 180° C. under 1 mbar, to give 21.25 g of the expected guanidine (yield 97%).

(A-3): N-butyl-N'-cyclohexyl-N-ethylpiperidine-1-carboxamidine 23.8 g of cyclohexyl isocyanate (0.190 mol) are added, dropwise, to a solution of 18.62 g of piperidine (0.219 mol) in 360 ml of hexane, then the cloudy mixture is refluxed for 2 h, and then cooled and filtered, to give 39.3 g of pure N-cyclohexylpiperidine-1-carboxamide (yield 98.3%). 12 g of POCl₃ (78 mmol) are added, over a period of 1 h, to a suspension of 15.05 g of said pure N-cyclohexylpiperidine-1-carboxamide (71.6 mmol) in 65 ml of dry toluene, then, after a few hours at 20° C., 18.1 g of N-butyl-N-ethylamine (0.179 mmol) are added over a period of 2 h, and then, after a further 2 h at 20° C., 50 ml of water are added. 49 g of 35% sodium hydroxide are then added while cooling, and then the two-phase medium is extracted with diisopropyl ether. After drying and evaporation to dryness, the oil obtained, 20 g, is distilled at 185° C. under 1 mbar, to give 17 g of the expected guanidine (yield 81%).

II) Demonstration of the Reactivity of the Guanidines According to the Invention The polyorganosiloxane polymers used are the following:

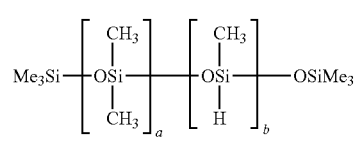

with $0 \leq a \leq 20$ and $30 \leq b \leq 55$

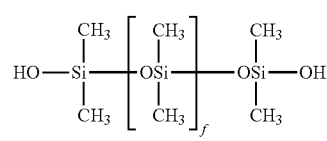

with $150 \leq f \leq 250$.

The preliminary tests were carried out on stoichiometric mixtures of a linear polydimethylsiloxane oil comprising a chain-end ≡SiOH function, of formula S4 (2 g, viscosity of 100 mPa·s) and of a branched poly(dimethyl)(hydrogeno)(methyl)siloxane oil comprising an ≡SiH unit, of formula S1 (0.25 g), stirred by means of a magnetic bar and in the presence of the potential catalysts. The times elapsed when the stirring stops, indicating crosslinking of the mixtures, were compared at 1% by weight of catalyst.

TABLE I

| Catalysts tested | Swelling time in min T° = 20° C. |
|---|---|
| A1 (molar content 0.071 mM) | 5 min |
| A2 (molar content 0.071 mM) | 8 min |

Thus, the 1 pentasubstituted alkylguanidines according to the invention can advantageously replace the tin-based catalysts, and the very expensive platinum-based catalysts in the dehydrogenative condensation reaction, at very low contents.

The invention claimed is:

1. A siloxane composition X which does not contain any metal catalyst and which can be polymerized and/or crosslinked by dehydrogenative condensation, the composition comprising:
   at least one organosiloxane monomer, oligomer and/or polymer B having, per molecule, at least one reactive ≡SiH unit;
   at least one organosiloxane monomer, oligomer and/or polymer C having, per molecule, at least one reactive ≡SiOH unit;
   a catalytically effective amount of at least one dehydrogenative condensation catalyst A which is a nonsilylated organic compound corresponding to general formula (I):

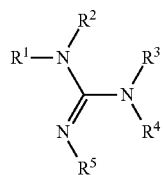

(I)

in which:
   the $R^1$, $R^2$, $R^3$, $R^4$ or $R^5$ radicals, which can be identical or different, represent, independently of one another, a linear or branched monovalent alkyl group, a cycloalkyl group or a (cycloalkyl)alkyl group, the ring being substituted or unsubstituted and can comprise at least one heteroatom or a fluoroalkyl group, an aromatic group, an arylalkyl group, a fluoroalkyl group, or an alkylamine or alkylguanidine group,
   the $R^1$, $R^2$, $R^3$ or $R^4$ radicals can be linked in pairs so as to form a 3-, 4-, 5-, 6- or 7-membered aliphatic ring optionally substituted with one or more substituents, and
   with the additional condition that the $R^1$, $R^2$, $R^3$, $R^4$ and $R^5$ radicals do not comprise a silicon atom,
   optionally at least one polyorganosiloxane resin D; and
   optionally at least one filler E.

2. The composition as claimed in claim 1, in which the dehydrogenative condensation catalyst A is a nonsilylated organic compound selected from the group consisting of the following compounds (A1) to (A4):

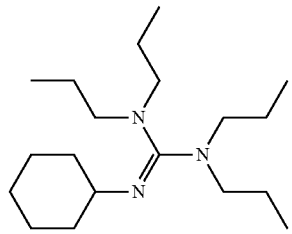

(A1)

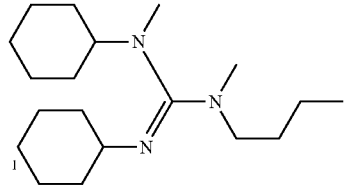

(A2)

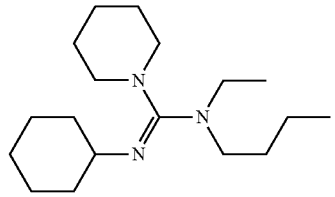

(A3)

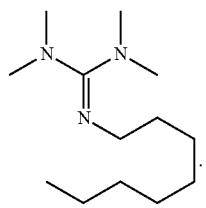

(A4)

3. The composition as claimed in claim 1, wherein the organosiloxane monomers, oligomers and/or polymers B possessing reactive ≡SiH units have at least one unit of formula (II) and end with units of formula (III) or are cyclic entities consisting of units of formula (II), these formulae being represented below:

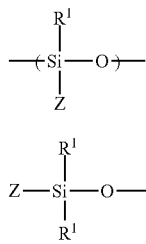

(II)

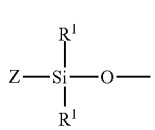

(III)

in which:
   the symbols $R^1$ are identical or different and represent:
      a linear or branched alkyl radical containing 1 to 8 carbon atoms, which is optionally substituted with at least one halogen,
      an optionally substituted cycloalkyl radical containing between 5 and 8 cyclic carbon atoms,
      an optionally substituted aryl radical containing between 6 and 12 carbon atoms, or
      an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms, the symbols Z are alike or different and represent:
  a hydrogen radical, or
  a group $R^1$ with the condition that there are, per molecule, at least two symbols Z representing a hydrogen atom.

4. The composition as claimed in claim 3, wherein when $R^1$ is a linear or branched alkyl radical substituted with at least one halogen, the at least one halogen is flourine.

5. The composition as claimed in claim 3, wherein when $R^1$ is a linear or branched alkyl radical, the alkyl radical is selected from the group consisting of methyl, ethyl, propyl, octyl and 3,3,3-trifluoropropyl.

6. The composition as claimed in claim 1, wherein the organosiloxane monomers, oligomers and/or polymers C possessing reactive ≡SiOH units have at least one unit of formula (IV) and end with units of formula (V) or are cyclic entities consisting of units of formula (IV), these formulae being represented below:

$$\begin{array}{c} R^2 \\ | \\ -\!\!\!-\!\!(\mathrm{Si}\!\!-\!\!\mathrm{O})\!\!-\!\!\!- \\ | \\ Z' \end{array} \quad (\mathrm{IV})$$

$$\begin{array}{c} R^2 \\ | \\ Z'\!\!-\!\!\mathrm{Si}\!\!-\!\!\mathrm{O}\!\!-\!\!\!- \\ | \\ R^2 \end{array} \quad (\mathrm{V})$$

in which:
the symbols $R^2$ are identical or different and represent:
  a linear or branched alkyl radical containing 1 to 8 carbon atoms, which is optionally substituted with at least one halogen,
  an optionally substituted cycloalkyl radical containing between 5 and 8 cyclic carbon atoms,
  an optionally substituted aryl radical containing between 6 and 12 carbon atoms, or
  an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms, and the symbols Z' are alike or different and represent:
  a hydroxyl group, or
  a group $R^2$ with the condition that, per molecule, at least two symbols Z represent a hydroxyl group —OH.

7. The composition as claimed in claim 6, wherein when $R^1$ is a linear or branched alkyl radical substituted with at least one halogen, the at least one halogen is flourine.

8. The composition as claimed in claim 6, wherein when $R^1$ is a linear or branched alkyl radical, the alkyl radical is selected from the group consisting of methyl, ethyl, propyl, octyl and 3,3,3-trifluoropropyl.

9. The composition as claimed in claim 1, wherein the organosiloxane monomers, oligomers and/or polymers B possessing a reactive ≡SiH unit correspond to general formula (VI):

$$R''^1\!\!-\!\!\mathrm{SiO}\!\!\left(\!\!\begin{array}{c} R'^1 \\ | \\ \mathrm{Si}\!\!-\!\!\mathrm{O} \\ | \\ H \end{array}\!\!\right)_x\!\!\left(\!\!\begin{array}{c} R'^1 \\ | \\ \mathrm{Si}\!\!-\!\!\mathrm{O} \\ | \\ R'^1 \end{array}\!\!\right)_y\!\!\begin{array}{c} R'^1 \\ | \\ \mathrm{Si}\!\!-\!\!R''^1 \\ | \\ R'^1 \end{array} \quad (\mathrm{VI})$$

in which:
x and y each represent an integer or fractional number ranging between 0 and 200,
$R'^1$ and $R''^1$ represent, independently of one another:
  a linear or branched alkyl radical containing 1 to 8 carbon atoms, which is optionally substituted with at least one halogen,
  an optionally substituted cycloalkyl radical containing between 5 and 8 cyclic carbon atoms,
  an optionally substituted aryl radical containing between 6 and 12 carbon atoms, or
  an aralkyl part having an alkyl part containing between 5 and 14 carbon atoms and an aryl part containing between 6 and 12 carbon atoms, which is optionally substituted on the aryl part, and
  it being possible for $R''^1$ also to correspond to hydrogen, with the condition according to which the radicals $R''^1$ correspond to hydrogen when x=0.

10. The composition as claimed in claim 9, wherein when $R^1$ is a linear or branched alkyl radical substituted with at least one halogen, the at least one halogen is flourine.

11. The composition as claimed in claim 9, wherein when $R^1$ is a linear or branched alkyl radical, the alkyl radical is selected from the group consisting of methyl, ethyl, propyl, octyl and 3,3,3-trifluoropropyl.

12. The composition as claimed in claim 1, wherein the organosiloxane monomers, oligomers and/or polymers C possessing a reactive ≡SiOH unit correspond to general formula (VII):

$$R''^2\!\!-\!\!\mathrm{SiO}\!\!\left(\!\!\begin{array}{c} R'^2 \\ | \\ \mathrm{Si}\!\!-\!\!\mathrm{O} \\ | \\ \mathrm{OH} \end{array}\!\!\right)_{x'}\!\!\left(\!\!\begin{array}{c} R'^2 \\ | \\ \mathrm{Si}\!\!-\!\!\mathrm{O} \\ | \\ R'^2 \end{array}\!\!\right)_{y'}\!\!\begin{array}{c} R'^2 \\ | \\ \mathrm{Si}\!\!-\!\!R''^2 \\ | \\ R'^2 \end{array} \quad (\mathrm{VII})$$

in which:
x' and y' each represent an integer or a fractional number ranging between 0 and 1200,
$R'^2$ and $R''^2$ represent, independently of one another:
  a linear or branched alkyl radical containing 1 to 8 carbon atoms, which is optionally substituted with at least one halogen,
  an optionally substituted cycloalkyl radical containing between 5 and 8 cyclic carbon atoms,
  an optionally substituted aryl radical containing between 6 and 12 carbon atoms, or
  an aralkyl part having an alkyl part containing between 5 and 14 carbon atoms and an aryl part containing between 6 and 12 carbon atoms, which is optionally substituted on the aryl part,
  it being possible for $R''^2$ also to correspond to OH, with the condition according to which the radicals $R''^2$ correspond to OH when x'=0.

13. The composition as claimed in claim 12, wherein when $R^1$ is a linear or branched alkyl radical substituted with at least one halogen, the at least one halogen is flourine.

14. The composition as claimed in claim 12, wherein when $R^1$ is a linear or branched alkyl radical, the alkyl radical is selected from the group consisting of methyl, ethyl, propyl, octyl and 3,3,3-trifluoropropyl.

15. A method of dehydrogenative condensation, the method comprising conducting the dehydrogenative condensation with at least one catalyst A as defined according to claim 1, wherein the dehydrogenative condensation is between at least one organosiloxane monomer, oligomer and/or polymer B possessing, per molecule, at least one reactive ≡SiH unit and at least one organosiloxane monomer, oligomer and/or polymer C possessing, per molecule, at least one reactive ≡SiOH unit.

16. A process for polymerizing and/or crosslinking a siloxane composition X as defined according to claim 1, wherein a dehydrogenative condensation reaction is carried out between said compounds B and C, and in that said dehydrogenative condensation is initiated with the catalyst A as defined according to claim 1.

17. A process for the production of at least one release coating on a support, wherein the process comprises applying to the support a siloxane composition X as defined according to claim 1, and then allowing the siloxane composition X to crosslink, optionally after thermal activation up to a temperature of 50° C.

18. The process as claimed in claim 17, wherein the support is a flexible support.

19. A process for the production of at least one article made of crosslinked silicone foam, the process comprising crosslinking a siloxane composition X as defined according to claim 1, ensuring that at least a part of the hydrogen gas formed is not expelled from the reaction medium.

20. A coating obtained by crosslinking and/or polymerization of the siloxane composition X as defined according to claim 1.

21. An article comprised of a solid material of which at least one surface is coated with the siloxane composition X as defined according to claim 1 which has been thermally crosslinked and/or polymerized.

22. A crosslinked silicone foam obtained by crosslinking a siloxane composition X as defined according to claim 1.

* * * * *